United States Patent [19]

Steigerwald

[11] Patent Number: 4,796,173

[45] Date of Patent: Jan. 3, 1989

[54] LOW INPUT VOLTAGE RESONANT POWER CONVERTER WITH HIGH-VOLTAGE A.C. LINK

[75] Inventor: Robert L. Steigerwald, Burnt Hills, N.Y.

[73] Assignee: General Electric Company, Schenectady, N.Y.

[21] Appl. No.: 150,599

[22] Filed: Feb. 1, 1988

[51] Int. Cl.$^4$ ............................................. H02M 3/335
[52] U.S. Cl. ....................................... 363/25; 363/64; 363/133
[58] Field of Search ...................... 363/24–26, 363/75, 64, 97, 131–134

[56] References Cited

U.S. PATENT DOCUMENTS

| | | | |
|---|---|---|---|
| 3,219,946 | 11/1965 | Compoly | 363/133 |
| 3,723,848 | 3/1973 | Miller | 363/133 |
| 3,851,278 | 11/1974 | Isono | 363/133 |
| 4,301,499 | 11/1981 | Levinson | 363/26 |
| 4,639,844 | 1/1987 | Gallios et al. | 363/133 |

Primary Examiner—Peter S. Wong
Attorney, Agent, or Firm—Geoffrey H. Krauss; James C. Davis, Jr.; Marvin Snyder

[57] ABSTRACT

A high-frequency resonant power converter transforms a relatively low D.C. input voltage to a relatively high A.C. link voltage to drive a resonant circuit. The high A.C. voltage appearing across a resonance circuit high-voltage capacitor is then transformed down to a relatively low value and rectified to obtain a desired relatively low D.C. output voltage. Use of a high A.C. link voltage eliminates low voltage operation of the resonance circuit, which would require very large resonant capacitors having high current ratings. Composite magnetic structures which combine a resonant inductor and a transformer are also disclosed.

18 Claims, 3 Drawing Sheets

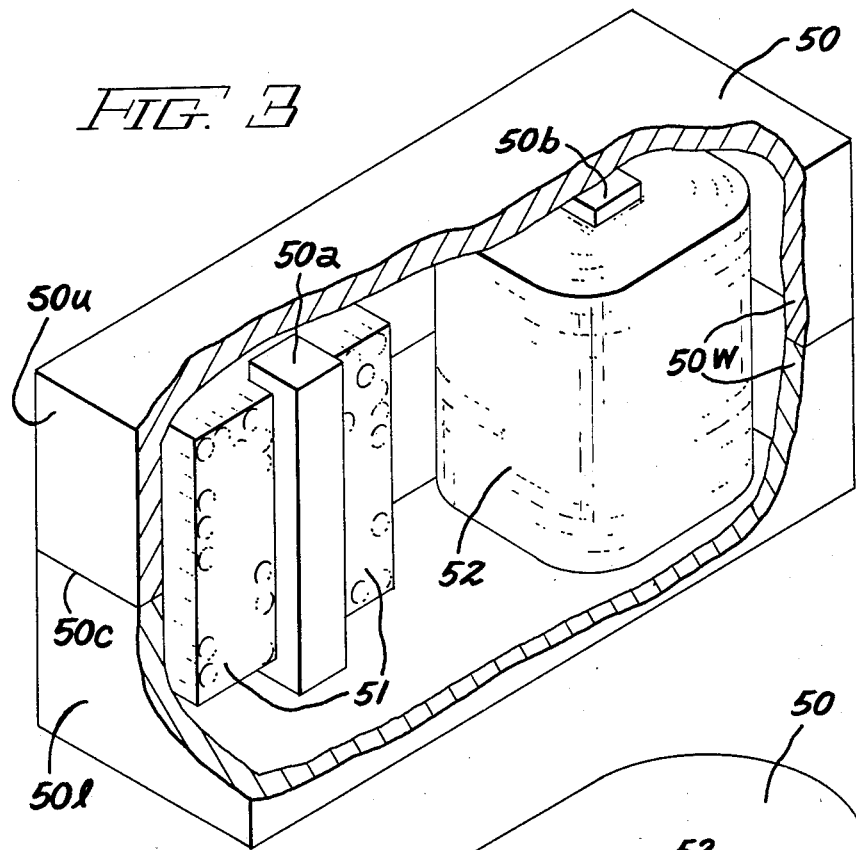
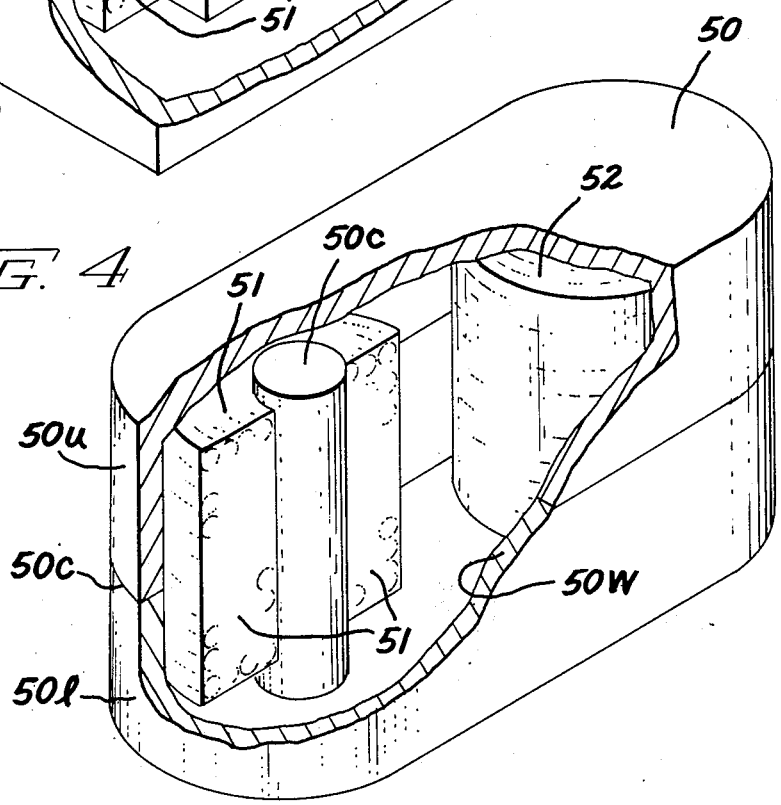

LOW INPUT VOLTAGE RESONANT POWER CONVERTER WITH HIGH-VOLTAGE A.C. LINK

BACKGROUND OF THE INVENTION

The present application relates to D.C.-to-D.C. power converters and, more particularly, to a novel resonant power converter having a relatively high voltage A.C. link section between relatively low D.C. voltage input and output sections.

It is well known to provide a D.C.-to-D.C. power converter utilizing a resonance circuit operating at about the same voltage as the input D.C. voltage. If this input voltage is relatively low, e.g. about 28 volts, then the resonance circuit capacitors operating at this low voltage are physically large and are not volumetrically efficient. If a low input D.C. voltage power supply is operated utilizing a much higher voltage circuit topology, than the resulting resonant capacitor size is excessive and the desired high powered densities cannot be achieved. Further, while high frequency operation is desirable to obtain high efficiency, capacitors suitable for lower-voltage/high-frequency operation are lossy and make it difficult, if not impossible, to obtain high efficiency. Thus, prior art low voltage input resonant circuits utilize resonant components with less than desirable lower power densities and efficiencies. It is highly desirable to provide a resonant power converter which not only operates from a relatively low input D.C. voltage, and provides a relatively low D.C. output voltage, but which also can operate at relatively high frequency and employ more desirable high voltage resonant circuit components.

BRIEF SUMMARY OF THE INVENTION

In accordance with the invention, a resonant power converter for providing a regulated D.C. output voltage responsive to a D.C. input voltage, comprises: output section means for providing the output D.C. voltage responsive to a first A.C. voltage of magnitude greater than the output voltage magnitude; input section means for transforming the D.C. input voltage to a second A.C. voltage, having an amplitude greater than the amplitude of the input D.C. voltage by a factor of at least three; means for monitoring at least one of the output D.C. voltages to provide a variable frequency driving signal to said input section; and a resonance circuit receiving the second A.C. signal from the input section and providing to the output section the first A.C. signal with a magnitude responsive to the ratio of the driving signal frequency with respect to the resonance frequency.

In a presently preferred embodiment, a series-parallel resonance circuit is utilized, with the output section including a voltage step-down transformer having a series leakage inductance tailored to provide the required value of series resonance inductance for the resonance circuit.

Accordingly, it is an object of the present invention to provide a novel resonant power converter having an input section receiving a relatively low input voltage and a relatively high voltage A.C. resonant link to a relatively low voltage D.C. output section.

This and other objects of the present invention will become apparent upon reading the following detailed description, when considered in conjunction with the drawings.

BRIEF DESCRIPTION OF THE DRAWINGS

FIGS. 3 and 4 are partially cut-away views of two different mechanical configurations for realizing the combination inductance-transformer means shown in FIGS. 2A and 2B.

DETAILED DESCRIPTION OF THE INVENTION

Figure 1:
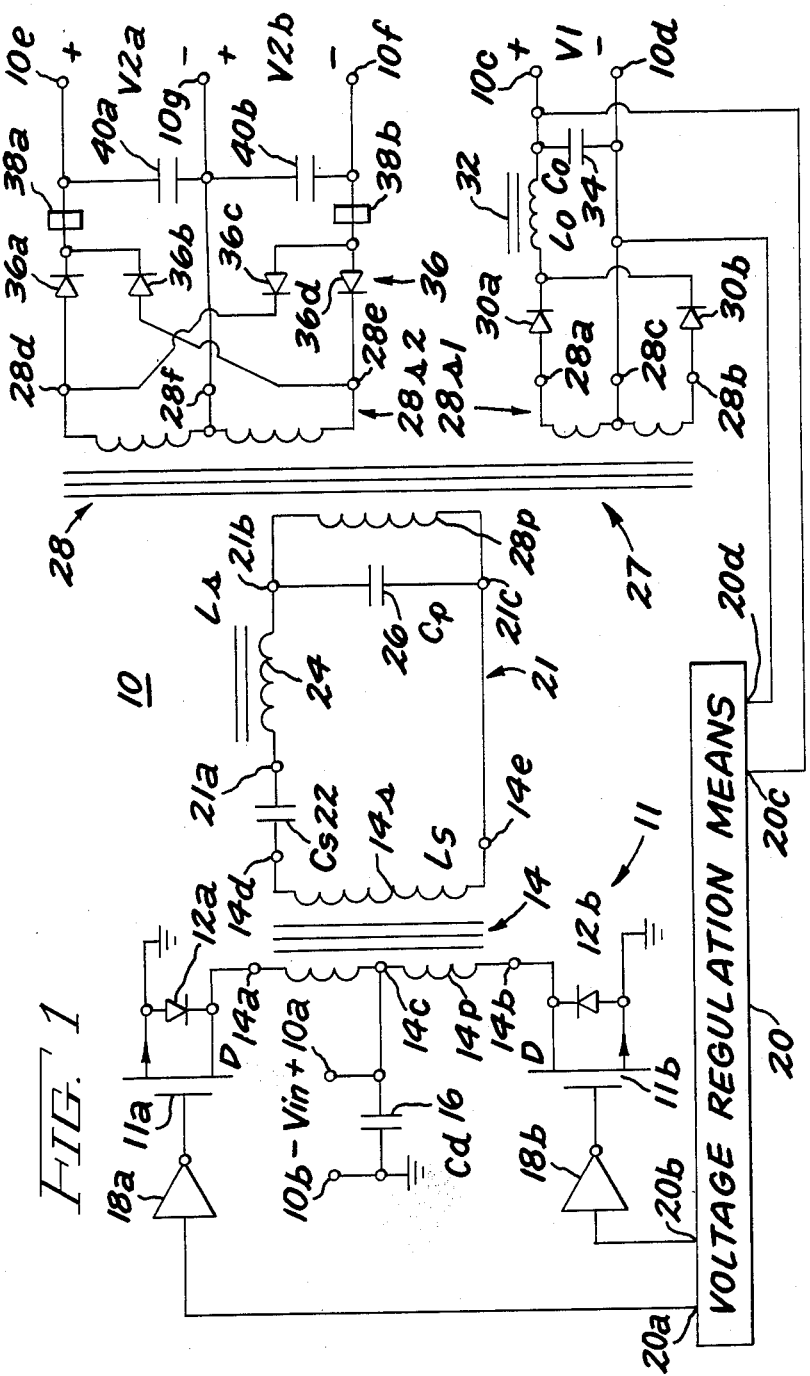
FIG. 1 is a schematic block diagram of a presently preferred embodiment of a power converter having the high-voltage A.C. link of the present invention.

Referring initially to FIG. 1, a presently preferred embodiment 10 of my novel power converter with D.C. input and output sections linked by a relatively high voltage A.C. section, includes an input section 11 which receives a D.C. input potential $V_{in}$ for conversion to an A.C. potential with variable frequency and an amplitude higher than the D.C. input voltage amplitude by a factor of at least three. Here, input section 11 is illustrated as a push-pull power inverter. The inverter utilizes a pair of switching devices 11, e.g. power FETs 11a and 11b, each having a controlled-conduction circuit, e.g. a drain-source circuit, thereof connected in parallel with a reverseconduction device, e.g. a diode 12a or 12b, each with the cathode thereof connected to the associated FET drain electrode. The FET source electrodes are both connected to a converter common potential. The respective switching device controlled-current, e.g. drain, electrode is connected to a respective end terminal 14a or 14b of a centertapped primary winding 14p of an input section transformer means 14. The primary winding center tap 14c is connected to an input D.C. voltage $V_{in}$ terminal 10a, at which the input voltage, e.g. 28 volts and the like, is provided with respect to a common potential terminal 10b. An input capacitance 16, of capacitive value Cd, can be connected between terminals 10a and 10b. The control, e.g. gate, electrode of each switching device, e.g. FET, 11a or 11b is connected to the output of a respective inverting driver means 18a or 18b, respectively having an input connected to a respective output 20a or 20b of a voltage regulation means 20. Regulation means 20 has a pair of inputs 20c and 20d which receive a power converter 10 D.C. output voltage, e.g. such as a first output voltage $V_1$ appearing at a D.C. potential output section terminal 10c, with respect to a common output terminal 10d. Means 20 provides a pair of complementary, oscillatory drive signals to inverters 18 and FET switching devices 11, with essentially a 50% switching duty cycle, at a frequency which changes to regulate the monitored D.C. output voltage.

In accordance with aspects of the present invention, input section 11 provides to a link, or resonant circuit, section 21 an A.C. potential of magnitude at least greater, and preferably at least a factor of three greater, than the magnitude of the D.C. input voltage $V_{in}$. Here, transformer 14 is a step-up transformer having a greater voltage, between the ends 14d and 14e of a secondary winding 14s, than the A.C. voltage applied across transformer primary winding 14p. By way of example only, transformer 14 may have a voltage step-up ratio of about 5:1, so that if the input voltage $V_{in}$ is about 28 volts D.C., then the A.C. voltage across secondary winding 14s will be approximately 140 volts RMS. This relatively high secondary-winding voltage is applied to link resonant circuit 21. Any form of resonant circuit can be used. By way of illustration only, here the resonant circuit 21 is a series-parallel resonant circuit, comprising: a series capacitor 22 connected between secondary winding end 14d and a first resonance circuit node 21a, and with a capacitance value Cs; a series inductor 24, connected between circuit nodes 21a and 21b, with an inductance value Ls; and a parallel capacitor 26, connected between node 21b and common node 21c (itself connected to the other end 14e of the inverter transformer secondary winding 14s), and with a capacitance value Cp. Because of the relatively high A.C. voltage across secondary winding 14s, due to the voltage step-up action of transformer 14, and also because of an additional voltage step-up action due to "ringing" in the resonant components (because circuit 21 has a circuit Q which is greater than 1), resonant circuit components 22, 24 and 26 operate at a relatively high A.C. voltage of several hundred volts. This relatively-high A.C. voltage allows practical high frequency capacitors, with relatively high energy density, to be utilized for capacitors 22 and 26.

In accordance with other principles of this invention, the A.C. voltage in link section 21 is reduced to provide a D.C. output voltage of magnitude less than the A.C. voltage RMS magnitude. Here, the relatively-high A.C. voltage generated across resonant capacitor 26 is applied to a D.C. output section 27, and thus appears across the primary winding 28p of an output transformer 28. This relatively-high A.C. voltage is stepped down to a relatively low A.C. voltage across the first secondary winding 28sl of the output transformer. Illustratively, this first winding is a center-tapped winding having first and second end terminals 28a and 28b, each connected to an anode of an associated one of rectifier means 30a or 30b, and having a center tap 28c connected to output common terminal 10d. The connected cathodes of rectifier means 30 provide a full-wave-rectified D.C. signal which is filtered by a series inductor 32, of inductance value Lo, and a shunt capacitor 34, of capacitance value Co, to provide the desired D.C. first output voltage V1 at terminal 10c, with respect to terminal 10d. It is this voltage that is, illustratively, fed back to regulation means 20, for control of the inverter frequency, with respect to the resonant frequency of circuit 21, to control the output voltage V1; further explanation may be had by reference to U.S. patent application Ser. No. 045,655, filed May 4, 1987, now U.S. Pat. No. 4,758,940, assigned to the assignee of the present application and incorporated herein in its entirety by reference. By way of illustration, a 10:1 step-down ratio may be utilized between output transformer primary winding 28p and secondary winding 28s1, to provide a high current D.C. output of V1=5 volts. If desired, additional output voltages, such as +V2, e.g. V2a= +15 volts and V2b= −15 volts, can be provided by a second secondary winding 28s2 and appropriate rectifier means 36 (e.g. a rectifier bridge of diodes 36a–36d connected to secondary winding terminals 28d and 28e and to center tap 28f) with filter inductances provided by ferrite beads 38a and 38b and output capacitors 40a and 40b, to provide a positive voltage at output terminal 10e and a negative voltage at output terminal 10f, both with respect to a common terminal 10g.

The novel use of a relatively high voltage A.C. resonant circuit link, between the input D.C. section 11 and the output D.C. section 27, thus allows the operational voltage of the resonant capacitors to be selected to optimize efficiency and energy density. Even though a pair of transformers 14 and 28 are necessary, the resulting small size and high efficiency of the resonance circuit, in addition to its high operating frequency, acts to more than offset the additional volume required for the second transformer, when compared to a power converter utilizing lowvoltage, high-current resonance capacitors.

Figure 2A:
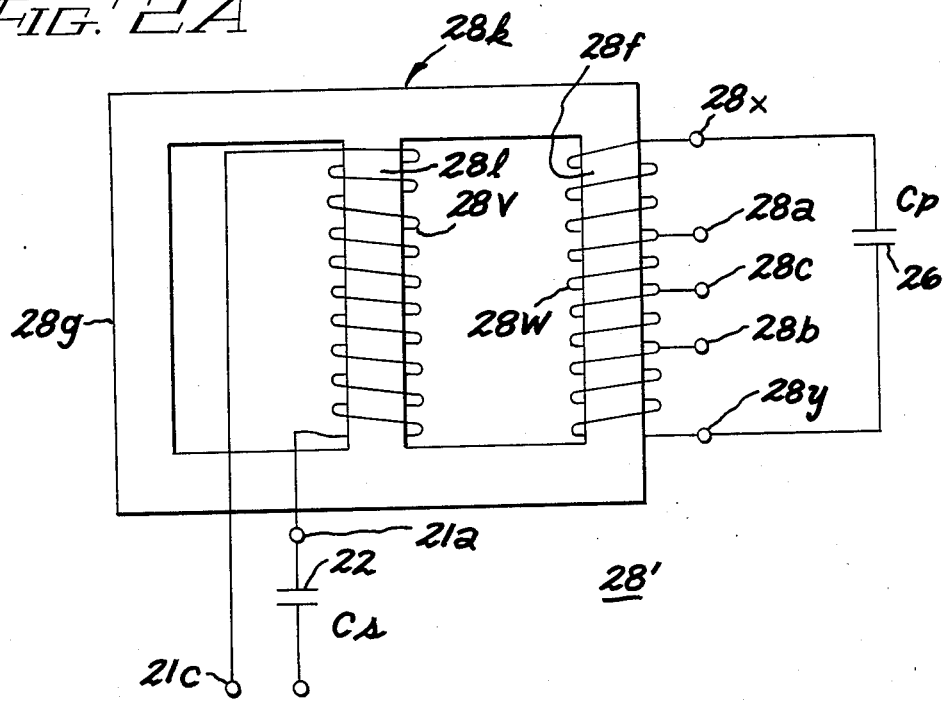
FIG. 2A is a somewhat schematic illustration of a combination inductance-transformer means and associated series and parallel capacitances for realizing a series-parallel resonant circuit for use in the power converter of FIG. 1.
Figure 2B:
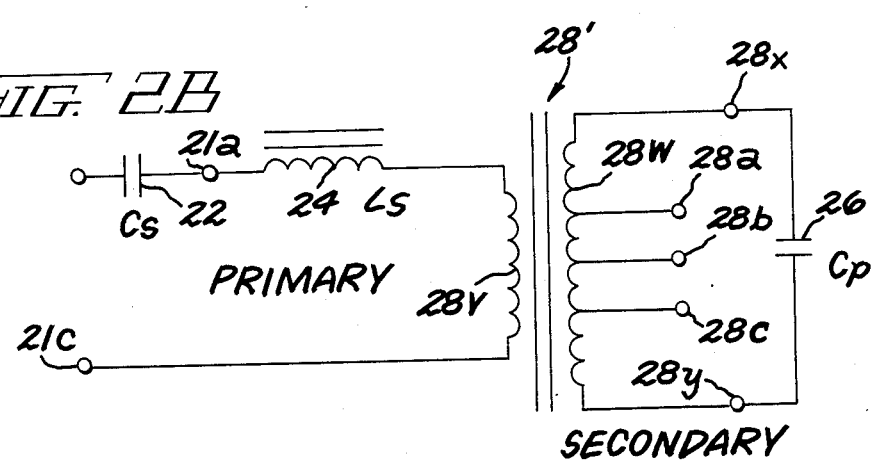
FIG. 2B is a schematic diagram of the apparatus of FIG. 2A.

The resonant circuit 21 power inductance 24 can be realized as the leakage inductance of either input transformer 14 or output transformer 28, so that inductor 24 need not appear as a separate magnetic element. See, for example, U.S. Pat. No. 4,695,934, issued Sept. 22, 1987, assigned to the assignee of the present application and incorporated herein in its entirety by reference. FIG. 2A illustrates one output transformer embodiment 28' in which a secondary winding 28w extends between first and second ends 28x and 28y to which parallel capacitor 26 is coupled; the step-down voltage terminals 28a and 28b appear symmetrically about a secondary winding center tap point 28c. This secondary winding 28w is wound about one outer leg 28f of a suitable magnetic core 28k, of E-I and the like form. A central leg 28l has a primary winding 28v wound thereupon, with the equivalent leakage inductance, forming series inductor $L_s$, being controlled by the magnetic shunt formed by a remaining core leg 28g. This is especially helpful, in that, for high switching frequency use, it is desirable to contain any leakage flux within the core (specifically, in leg 28g) rather than to allow the leakage flux to enter the air surrounding the core. It will be understood that one or more air gaps, as necessary, can be inserted, even though not specifically shown in the drawings. It will be seen that the series resonance capacitor 22 is series connected with primary winding 28l, to complete the series-parallel resonance circuit utilized by way of illustration in the A.C. link of the present illustrated embodiment.

FIGS. 3 and 4 illustrate two possible forms for the composite magnetic structure 50, in which the combination transformer and power inductor, formed by an enclosing flux leakage shell, may be realized. The magnetic power component 50 may be of rectangular shape, as shown in FIG. 3, having upper and lower halves 50u and 50l, respectively about a center parting line 50c, and with interior magnetic posts 50a and 50b, here of square or rectangular cross section, about which the primary winding 51 and secondary winding 52 can be placed, in the form of bobbins and the like. The wall portions 50w will be seen to provide the magnetic shunt which limits the flux in air surrounding the magnetic "core" (comprised of at least members 50a and 50b and the wall material therebetween). Similarly, in FIG. 4, magnetic power component 50 can be rounded end portions and cylindrical core pieces 50c (and 50d, not shown) with circular and the like cross-sections. The winding ends exit the magnetic structure through vertical slots (not shown) in the wall portions, for connection to the circuit.

By way of example, a 28 volt input power supply, providing outputs of 5 volts and +15 volts, at about 100 watts total output power, has been satisfactorily operated, utilizing an output transformer 28 having a primary winding 28p of 22 turns, with a 5 volt center-tap secondary winding 28S1 of 2-2 turns and a +15 volt secondary 28S2 of 4-4 turns. An input transformer 14 with a center-tapped primary winding 14p of 6-6 turns and a output winding 14s (also providing the leakage inductance for operation between about 0.4 MHz. and about 1.0 MHz.) of about 31 turns, and thus having approximately the aforementioned 1:5 step-up ratio.

While one presently preferred embodiment of my novel resonant power converter, having low input and output D.C. voltages with a relatively high-voltage A.C. resonant circuit link therebetween, has been described herein, many variations and modifications will now become apparent to those skilled in the art. It is my intent to be limited only by the scope of the appending claims and not by the specific details and instrumentalities presented by way of description of the embodiment described herein.

What I claim is:

1. A power converter for providing at least one regulated D.C. output potential responsive to a D.C. input potential, comprising:
   output section means for providing the at least one D.C. output potential responsive to a first A.C. potential;
   input section means for transforming the D.C. input potential to a second A.C. voltage, having an amplitude which is greater than the amplitude of the D.C. input potential;
   means for monitoring a selected one of the at least one D.C. output potential to provide a driving signal to said input section means with a value of a selected parameter which causes the second A.C. potential to change to maintain the at least one D.C. output potential substantially at a selected regulated value; and
   A.C. link section means receiving the second A.C. potential from the input section means for providing to the output section means the first A.C. signal with a magnitude greater than the selected value of the at least one D.C. output potential and also responsive to variation of said selected parameter.

2. The power converter of claim 1, wherein the second A.C. potential magnitude is greater than the input D.C. potential by a factor of at least three.

3. The power converter of claim 2, wherein the ratio of the magnitudes of the second A.C. and input D.C. potentials is about five.

4. The power converter of claim 2, wherein the ratio of the magnitudes of the first A.C. and output D.C. potentials is about ten.

5. The power converter of claim 2, wherein the selected parameter of the monitoring means is the variable frequency of the driving signal; and said link section means comprises a resonant circuit having a fixed resonant frequency.

6. The power converter of claim 5, wherein the resonant circuit Q is selected to cause the first A.C. potential to be of magnitude greater than the magnitude of the second A.C. potential.

7. The power converter of claim 6, wherein the resonant circuit is a series-parallel resonant circuit.

8. The power converter of claim 7, wherein said resonant circuit includes: a common node; an input node receiving the second A.C. potential thereat, with respect to the common node; an output node at which said first A.C. potential appears, with respect to the common node; a first capacitor; an inductance in electrical series connection with said first capacitor between said input and output nodes; and a second capacitor effectively in electrical parallel connection between said output and common nodes.

9. The power converter of claim 8, wherein said output section means includes: an output transformer having a first winding receiving the first A.C. potential, and a secondary winding; and means for converting an A.C. potential across a selected portion of the output transformer secondary winding to the D.C. output potential.

10. The power converter of claim 9, wherein the transformer is a step-down transformer, providing the A.C. potential across the secondary winding selected portion with a magnitude less than the magnitude of the first A.C. potential across the primary winding.

11. The power converter of claim 9, wherein the transformer has a leakage inductance selected to provide the inductance in electrical series connection with the first capacitor.

12. The power converter of claim 11, wherein the input transformer has a magnetic structure comprising: a first member having at least the first winding positioned thereabout between opposite member ends; a second member having at least the second winding positioned thereabout between opposite member ends; and an outer shell magnetically linked to the ends of both members and sufficiently enclosing both members and all of the windings to provide the selected value of leakage inductance.

13. The power converter of claim 9, wherein the second capacitor is physically connected across at least a portion of the secondary winding.

14. The power converter of claim 8, wherein said input section means includes: inverter means for converting the D.C. input potential to an oscillatory signal; and an input step-up transformer having a first winding receiving the oscillatory signal, and a secondary winding across which said second A.C. potential appears.

15. The power converter of claim 14, wherein said input transformer has a ratio of first winding turns to second winding turns greater than three.

16. The power converter of claim 15, wherein the first winding is a center-tapped winding and the input transformer has about a 5:1 ratio of second winding turns to turns in each half of the first winding.

17. The power converter of claim 14, wherein the input transformer has a leakage inductance selected to provide the inductance in electrical series connection with the first capacitor.

18. The power converter of claim 17, wherein the input transformer has a magnetic structure comprising: a first member having at least the first winding positioned thereabout between opposite member ends; a second member having at least the second winding positioned thereabout between opposite member ends; and an outer shell magnetically linked to the ends of both members and sufficiently enclosing both members and all of the windings to provide the selected value of leakage inductance.

* * * * *